Oct. 4, 1966 D. A. VENN 3,277,389

AFC FOR PLURAL OSCILLATORS

Filed Dec. 30, 1959 3 Sheets-Sheet 1

INVENTOR
DOUGLAS A. VENN

BY Richard C. Reed

ATTORNEY

INVENTOR
DOUGLAS A. VENN
BY Richard C. Reed
ATTORNEY

Oct. 4, 1966 D. A. VENN 3,277,389

AFC FOR PLURAL OSCILLATORS

Filed Dec. 30, 1959 3 Sheets-Sheet 3

INVENTOR
DOUGLAS A. VENN

BY Richard C. Reed

ATTORNEY

United States Patent Office 3,277,389
Patented Oct. 4, 1966

3,277,389
AFC FOR PLURAL OSCILLATORS

Douglas A. Venn, Suitland, Md., assignor to the United States of America as represented by the Secretary of the Navy Filed Dec. 30, 1959, Ser. No. 863,052
5 Claims. (Cl. 331—2)

The invention described herein may be manufactured and used by or for the Government of the United States of America for governmental purposes without the payment of any royalties thereon or therefor.

This invention relates in general to a frequency control system and in particular to one for sequentially disciplining a plurality of oscillators with a single precision source.

Very often it is desired to control several electronic and electrical devices with a single precision source. One arrangement in the prior art accomplishes this end by providing a decade frequency generating system wherein all frequencies for the individual components are derived by separate decade generators which are driven by the precision source. Although this arrangement is complex and expensive, its major disadvantage lies in the dependence of all the equipment on a single source.

Accordingly, it is an object of the present invention to provide a system wherein a single frequency synthesizer controls all the required frequencies of a number of equipments in an orderly and repetitive manner.

Another object of the present invention is to provide an arrangement which allows the individual equipments to continue functioning even when the frequency standard or disciplining system fails.

These and other objects are accomplished by employing separate oscillators in each electronic or electrical component and adjusting the frequency and/or phase drift in each oscillator automatically and sequentially by means of a single standard source.

In one embodiment of the invention, a frequency information unit, operated by a timer, controls a frequency synthesizer to sequentially provide a plurality of standard frequencies that are applied to a comparator. Simultaneously, the timer controls an arrangement that sequentially applies the output of each of a plurality of oscillators so that the output of each oscillator is compared with a standard frequency and a correction signal, if necessary, is applied to the oscillator.

The more detailed nature of the invention will be readily apparent from a consideration of the following specification relating to the annexed drawing in which like reference numerals designate like parts throughout the figures and wherein.

Figure 1:
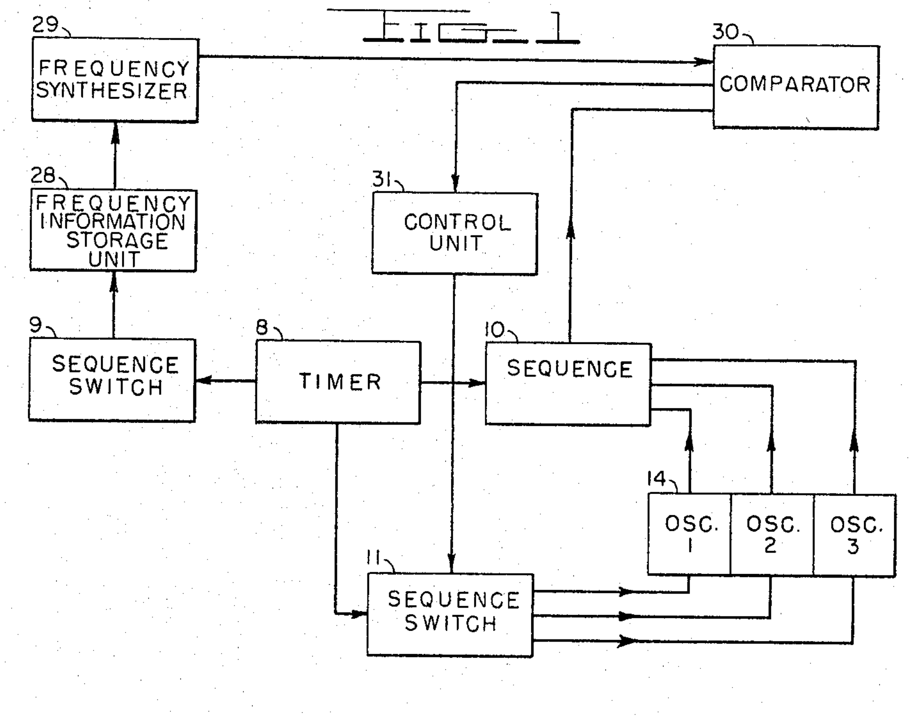
FIG. 1 is a first embodiment.
Figure 2:
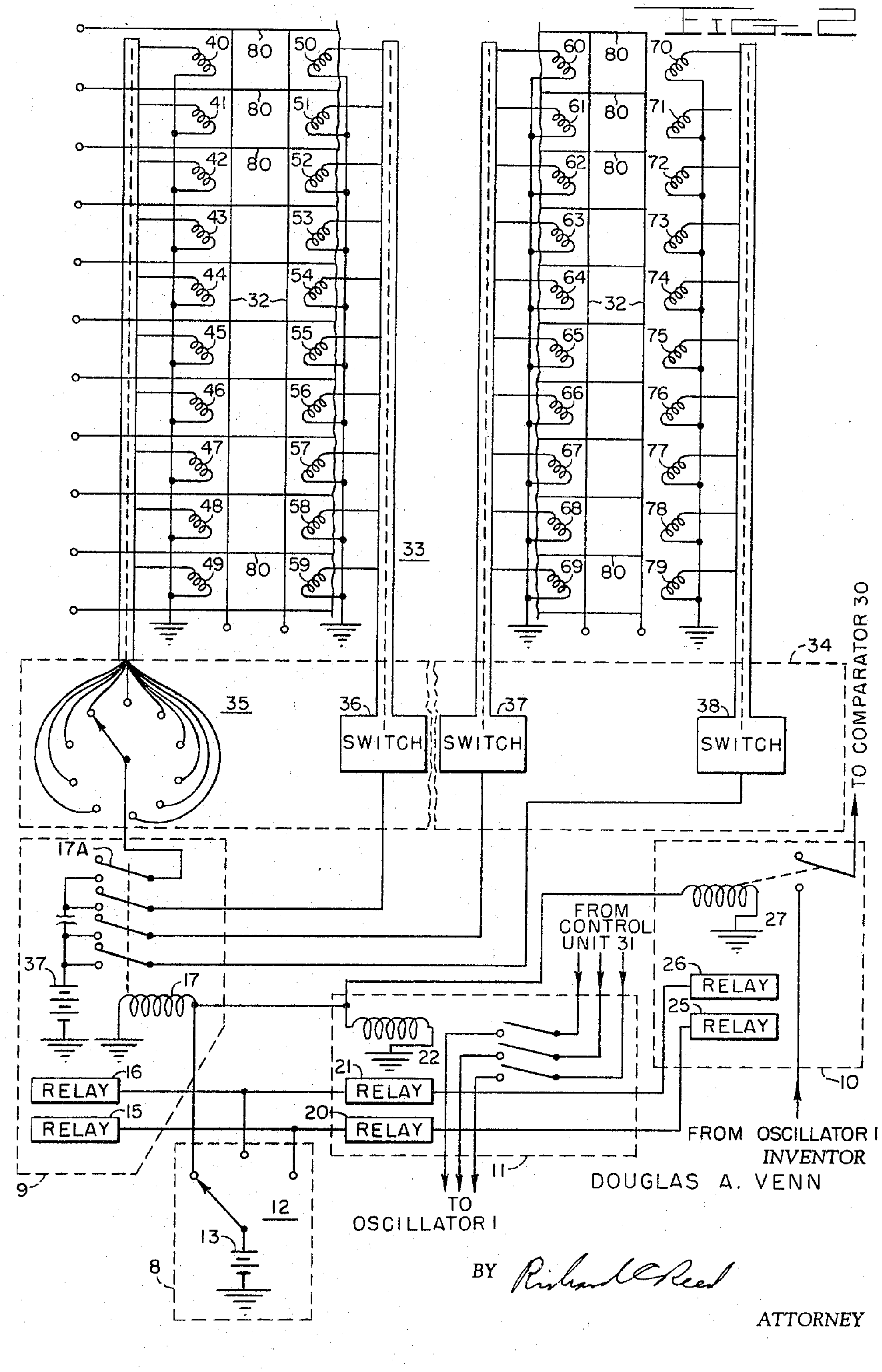
FIG. 2 is one detail of the embodiment in FIG. 1.
Figure 3:
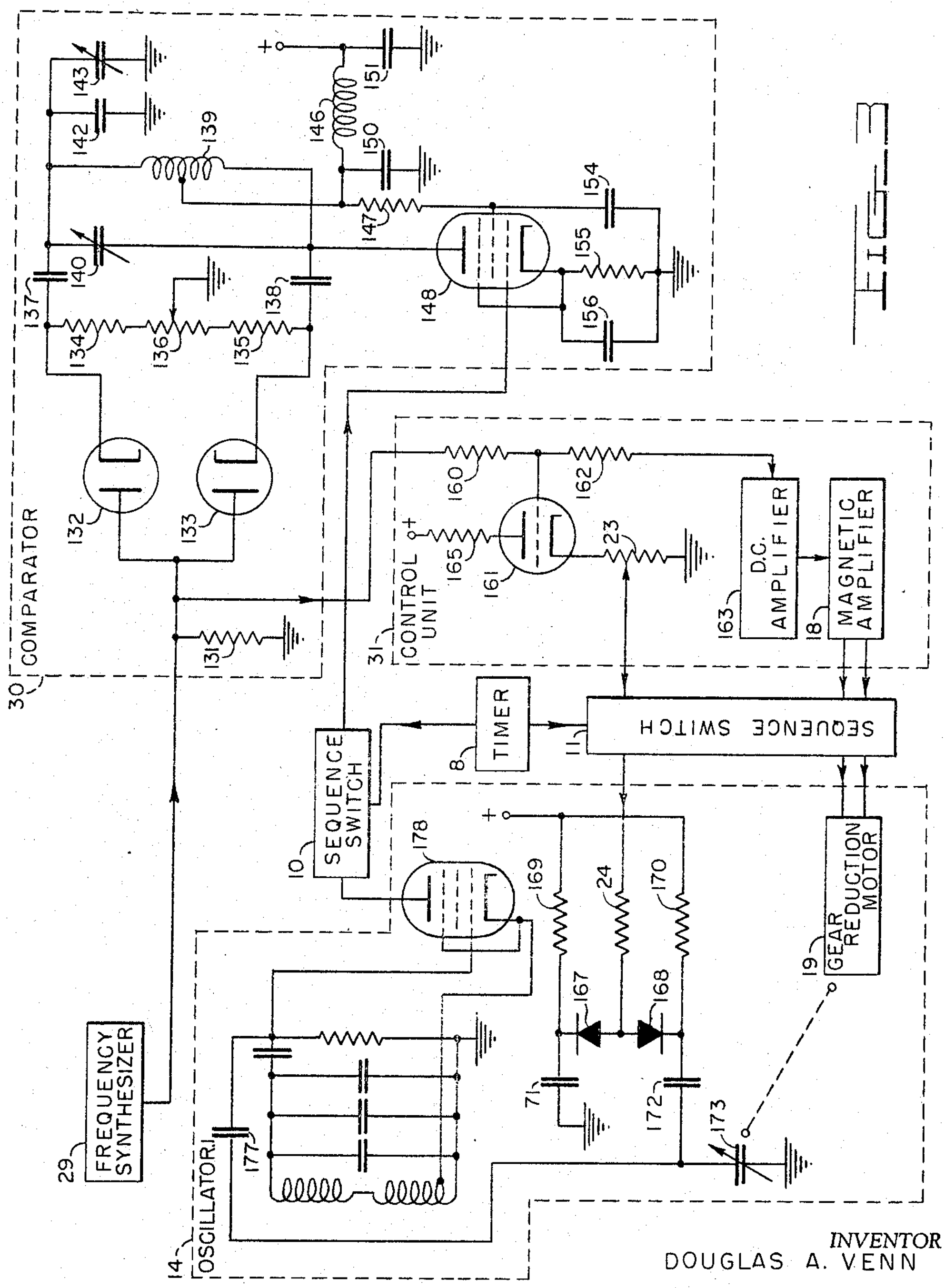
FIG. 3 is another detail of the embodiment of FIG. 1.

Referring to FIGS. 1 to 3, timer 8 controls sequence switches 9 to 11. Although many conventional types of timers and sequence switches may be used in the present embodiment, timer 8 is selected to include a motor driven, three-contact stepping switch 12. A source of D.C. potential 13 is connected to the arm of the stepping switch. As will become apparent, the number of contacts in the stepping switch is determined by the number of oscillators to be controlled. Bank of oscillators 14 includes oscillators 1, 2, and 3 but it is understood that the bank may embrace as many oscillators as desired. Sequence switch 9 includes relays 15 to 17, one relay for each oscillator, each relay, as shown in detail in FIG. 2 in connection with relay 17, having ten pairs of contacts. Sequence switch 11 contains relays 20 to 22, each having three pairs of contacts, each relay being associated with a respective one of oscillator 1 to 3. When one of the relays 20 to 22 is energized, two of the contacts of the relay connect the output of magnetic amplifier 18 in FIG. 3 to gear reduction motor 19 and the third contact connects variable resistor 23 to resistor 24. Sequence switch 10 likewise includes relays 25 to 27, each having a pair of contacts associated with a particular oscillator. Since relays 17, 22, 27, relays 16, 21, 26, and relays 15, 20, 27 form three groups of relays, each group connected to a different contact in stepping switch 12, for each position of the stepping switch all the relays associated with a respective oscillator 1, 2, or 3 are energized simultaneously. Although a separate relay in each of sequence switches 9 to 11 is shown for each oscillator 1 to 3, in practice a single relay for each oscillator having 14 pairs of contacts may be used.

The output of frequency synthesizer 29 is applied directly to comparator 30 while the outputs of oscillators 1, 2 and 3 are applied to the comparator through the contacts of relays 27, 26, 25, respectively, in sequence switch 10. An error signal, if required, is applied from the comparator to the oscillators through control unit 31 and relays 22, 21, and 20, respectively, in sequence switch 11. The error signal is proportional in magnitude to the instantaneous frequency and/or phase difference of the signals applied to comparator 30.

The output of sequence switch 9 is applied to frequency storage unit 28 which controls frequency synthesizer 29. The frequency synthesizer is disclosed in detail in copending application Serial No. 784,404, filed December 31, 1958, by Robert R. Stone, Jr., now U.S. Patent No. 3,119,-078. Frequently storage unit 28 includes a plurality of banks of switches, one bank for each oscilliator 1 to 3, each bank having one switch for each of the ten vertical bars 32 in the cross-bar switch 33 in frequency synthesizer 29.

Referring to FIG. 3, the output of frequency synthesizer 29 is applied across resistor 131 which is connected to the plate of diode 132 and the cathode of diode 133 in comparator 30. Resistors 134, 135 and variable resistor 136 are connected in series and across the cathode and plate of diode 132, 133. Likewise, capacitors 137, 138 and coil 139 are connected in series across the cathode and plate of the diodes. Variable capacitor 140 is positioned across coil 139 and capacitors 142 and 143 are each connected across coil 139 to ground. Positive potential is applied through coil 146 and the center tap of coil 139 to the cathode of diode 132 and the plate of diode 133 as well as through resistor 147 to the screen grid of electron tube 148. Capacitors 150 and 151 are each located across one side of coil 146 and ground. The screen grid of electron tube 148 is grounded through capacitor 154, the suppressor grid is connected to the cathode which is grounded through resistor 155 and the plate is connected to capacitors 138 and 140. Capacitor 156 is positioned across resistor 155.

The output of oscillator 1 is conducted through sequence switch 10 to the control grid of electron tube 148 while the output of comparator 30 is applied through resistor 160 to the control grid of electron tube 161 in control unit 31 and through resistor 162 to D.C. amplifier 163. The plate of electron tube 161 is connected to positive potential through resistor 165 and the cathode is grounded through variable resistor 23.

Diodes 167 and 168, connected back to back, are variable capacitance silicon diodes. Positive potential is applied through resistors 169 to the cathode of diode 167 and resistor 170 to the cathode of diode 168. The cathode of diode 167 is connected to ground through capacitor 171 and the cathode of diode 168 is grounded through capacitor 172 and variable capacitor 173. The cathodes of the diodes are connected to variable resistor 23 through sequence switch 11 and resistor 24. D.C. amplifier 163 controls magnetic amplifier 18 that drives gear reduction motor 19 which is connected to and controls variable capacitor 173 through a mechanical arrangement illustrated by a dotted line. A terminal located between variable capacitor 173 and capacitor 172 is connected through capacitor 177 to the control grid of electron tube 178 which is located in one type of conventional oscillator. The plate of electron tube 178 is connected through sequence switch 10 to the control grid of electron tube 148.

In the operation of the embodiment in FIGS. 1 to 3, oscillators 1, 2 and 3 are adjusted to provide frequencies $f_1$, $f_2$, and $f_3$, respectively. Frequency information storage unit 28 is set so that when operated sequentially by timer 8 frequency synthesizer 29 will be operated to provide standard frequencies $F_1$, $F_2$, and $F_3$. When the timer is in the position shown in FIG. 2, relay 17 is energized to apply potential to bank of switches 34 which controls frequency synthesizer 29 to apply standard frequency $F_1$ to phase comparator 30. Simultaneously, relay 27 is operated to apply frequency $f_1$ to the phase comparator. If $f_1$ differs in frequency and/or phase from $F_1$, an error signal is applied to the control grid of electron tube 161 in control unit 31. Variations in the output voltage of the electron tube due to variations in the magnitude of the error signal are applied through sequence switch 11 to effect a change in capacity of diodes 168, 167 electrically tuning oscillator 1. If the original unbalance voltage in the comparator is of the correct sense, and it can be made so, the oscillator frequency will be corrected in the proper direction to come into synchronization with the selected reference frequency but not necessarily into proper phase relationship for balance in the comparator. Thus, frequency lock may be accomplished immediately but with a phase displacement unbalancing the comparator and giving rise to a control voltage on the grid of electron tube 161. If the reference frequency were removed under these conditions, oscillator 1 would revert to its uncorrected previous frequency.

In order to make the change permanent, i.e., until the next change is needed, the output of comparator 30 is applied to gear reduction motor 19 through D.C. amplifier 163 and magnetic amplifier 18 to bring the outputs of oscillator 1 and frequency synthesizer 29 into the same phase relationship. The motor applies a cumulative long term correction to the oscillator mechanically adjusting the setting of variable capacitor 173 during each disciplining period.

The combination of the two servo links, electrical for instantaneous but temporary correction and mechanical for cummulative correction, provides a continuing integration of the correction to oscillator 1 even though the sampling of the error signal or disciplining period may be exceedingly short and may be limited only by the speed of operation of the servomechanism. Thus, the servo links function as an electrical ratchet which permits the removal of the error signal after a short period of its application without reversion of oscillator 1 to its previous uncorrected state. Thus the instantaneous but temporary correction which reverts when each comparison is ended may be termed "regressive" and the other correction which does not revert when each comparison is ended may be termed "nonregressive".

In substantially the same manner as indicated in connection with oscillator 1, when timer 8 is in the second and third positions, the output of oscillators 2 and 3 are compared with standard frequencies $F_2$ and $F_3$, respectively, and the oscillators are adjusted, if necessary, to provide signals having these frequencies.

Figure 4:
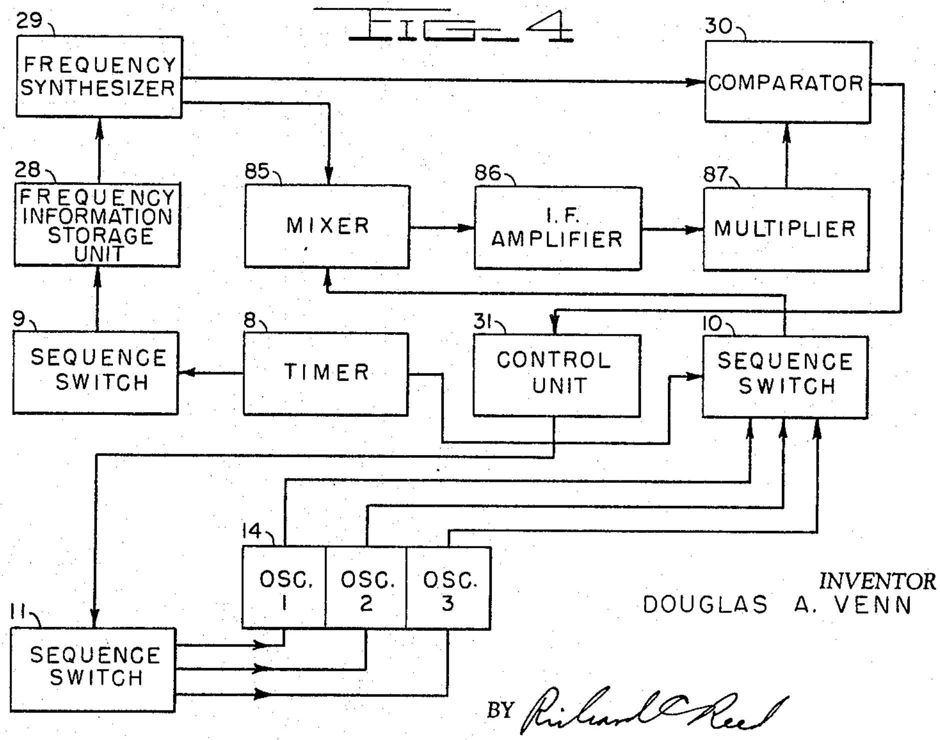
FIG. 4 is a second embodiment.

Referring to FIG. 4, a fixed reference frequency $F_4$, obtained from frequency synthesizer 29, is applied to comparator 30 and a plurality of selected reference frequencies $F_1$, $F_2$ and $F_3$, determined by the setting of the plurality of banks of switches in frequency information storage unit 28, are applied sequentially from the frequency synthesizer to mixer 85. The signals provided by oscillators 1, 2, 3 are sequentially applied through sequence switch 10 to mixer 85, and the output of the mixer is fed through IF amplifier 86 and multiplier 87 to comparator 30. The error signals, if any, derived from the latter, are applied through control unit 31 and sequence switch 11 to the appropriate one of oscillators 1, 2, or 3.

Considering a typical operation of the embodiment disclosed in FIG. 4, frequency synthesizer 29 applies selected reference frequency $F_1$ and oscillator 1 applies frequency $f_1$ to mixer 85 obtaining a selected IF component, say 500 kc. IF amplifier 86 is centered at this frequency to provide gain and sideband suppression, and a large increase in phase sensitivity is realized by multiplying the 500 kc. signal, for example, forty times and comparing the phase of the resulting 20 mc. signal with that of the, for example 20 mc. output $F_4$ derived from frequency synthesizer 29. A small phase or frequency change in the output of oscillator 1 with respect to the fixed reference frequency $F_4$ then produces a relatively large D.C. output voltage from comparator 30 which is used as an error signal. The error signal is applied through control unit 31 and sequence switch 11 to control oscillator 1 in the same manner as the embodiment disclosed in FIGS. 1 to 3.

Obviously many modifications and variations of the present invention are possible in the light of the above teachings. It is therefore to be understood that within the scope of the appended claims, the invention may be practiced otherwise than as specifically described.

What is claimed is:

1. Means for periodically controlling the outputs of a plurality of output producing means having at least one significant variable characteristic in common comprising reference output means adapted to provide a base reference output having said common significant characteristic; first output comparison means adapted to provide an output signal initially proportional to the difference between said common characteristic of said outputs; a plurality of first and second output correction means associated with each of said output producing means with each first and second correction means adapted to control at least said common characteristic of its respective output producing means, said first and second output correction means adapted to provide a substantially identical correction at a rapid rate and at a relatively slower rate, respectively, in response to an initial input signal, said first and second output correction means being regressive and nonregressive respectively, in the absence of an input signal; and electrical connection means including recycling switching means adapted to repetitively connect the output of each of said output producing means in said plurality thereof in selected sequence and the base reference output of said reference means to said first output comparison means for comparison in said selected sequence, and to connect the output of said first comparison means to each pair of said first and second output correction means of the respective output producing means for output correction thereof such that said first and second output correction means are operative during the course of comparison by said first comparison means.

2. Means for periodically controlling as defined in claim 1 wherein said at least one significant common characteristic of said reference output means and said output producing means in said plurality thereof is a frequency characteristic and said first and second output correction means are frequency correction means.

3. Means for periodically controlling as defined in claim 2 wherein the output frequencies of each of said output producing means differs.

4. Means for periodically controlling as defined in claim 3 wherein said reference output means is adapted to provide a plurality of base reference frequencies each in selected frequency relation to the output frequency of a respective one of said output producing means.

5. Means for periodically controlling as defined in claim 4 wherein said first output correction means is a reactance element of the semi-conductor variety having a variable reactance characteristic responsive to an electrical signal and said second output correction means is a reactance element of the variety having a movable section adapted to control the reactance thereof.

References Cited by the Examiner

UNITED STATES PATENTS

| | | | |
|---|---|---|---|
| 2,640,155 | 5/1953 | Rambo | 331—25 |
| 2,774,872 | 12/1956 | Howson | 331—34 |
| 2,843,740 | 7/1958 | Mantz et al. | 331—2 |
| 2,914,732 | 11/1959 | Roth | 331—18 |
| 2,956,234 | 10/1960 | Olsen | 331—36 |

ROY LAKE, *Primary Examiner.*

FREDERICK M. STRADER, *Examiner.*

K. CLAFFY, R. D. JENNINGS, J. KOMINSKI, *Assistant Examiners.*